(No Model.) 2 Sheets—Sheet 1.

G. L. DALE.
AUTOMATIC EGG BOILER.

No. 447,945. Patented Mar. 10, 1891.

WITNESSES:
A. Kent
Edward Kent

INVENTOR
Geo. L. Dale
BY
Edward Kent Jr.
ATTORNEY.

(No Model.) 2 Sheets—Sheet 2.

G. L. DALE.
AUTOMATIC EGG BOILER.

No. 447,945. Patented Mar. 10, 1891.

WITNESSES:
N. R. Kent.
Edward Kent.

INVENTOR
Geo. L. Dale
BY
Edward Kent Jr.
ATTORNEY.

UNITED STATES PATENT OFFICE.

GEORGE L. DALE, OF NEWARK, NEW JERSEY.

AUTOMATIC EGG-BOILER.

SPECIFICATION forming part of Letters Patent No. 447,945, dated March 10, 1891.

Application filed September 20, 1890. Serial No. 365,619. (No model.)

*To all whom it may concern:*

Be it known that I, GEORGE L. DALE, a citizen of the United States, residing at Newark, in the county of Essex and State of New Jersey, have invented certain new and useful Improvements in Automatic Egg-Boilers; and I do hereby declare the following to be a full, clear, and exact description of the invention, such as will enable others skilled in the art to which it appertains to make and use the same.

This invention relates to egg-boilers of the class illustrated, described, and claimed in my prior patent of the United States, No. 375,539, of December 27, A. D. 1887, the main object of the present invention being to provide for the immersion of any desired number of eggs for a predetermined length of time, and this object I accomplish by providing the egg-receiving vessel, which is formed with a discharge-opening, with a combined closing and regulating valve, all as will be hereinafter more fully described, and specifically pointed out in the claims.

Reference is to be had to the accompanying drawings, forming a part of this specification, in which similar reference-letters indicate corresponding parts in all of the views.

Figure 1:
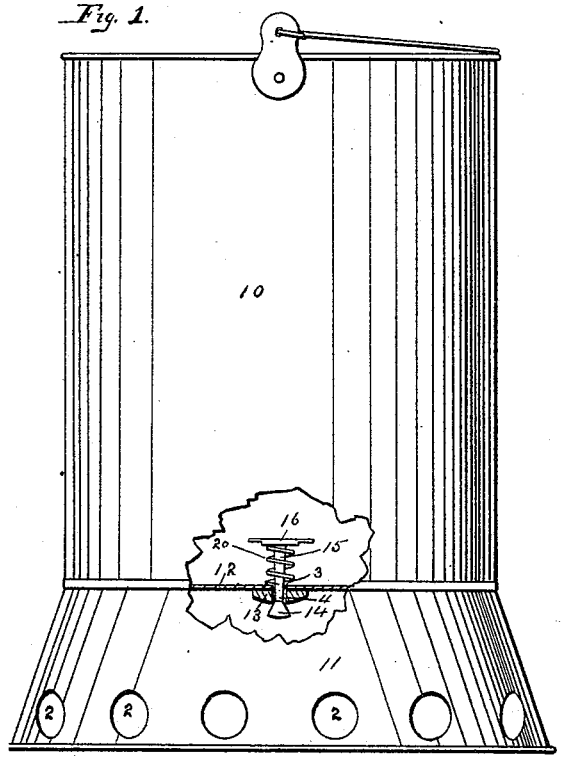
Figure 2:
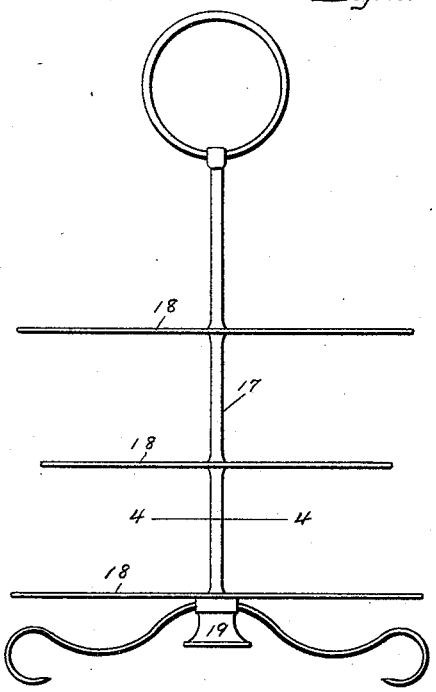
Figure 3:
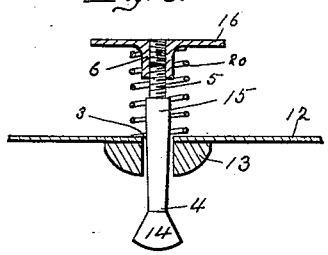
Figure 4:
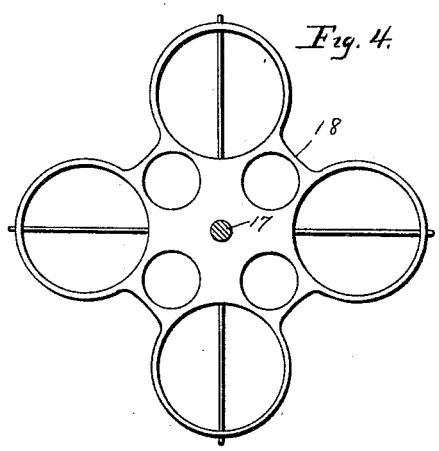
Figure 5:
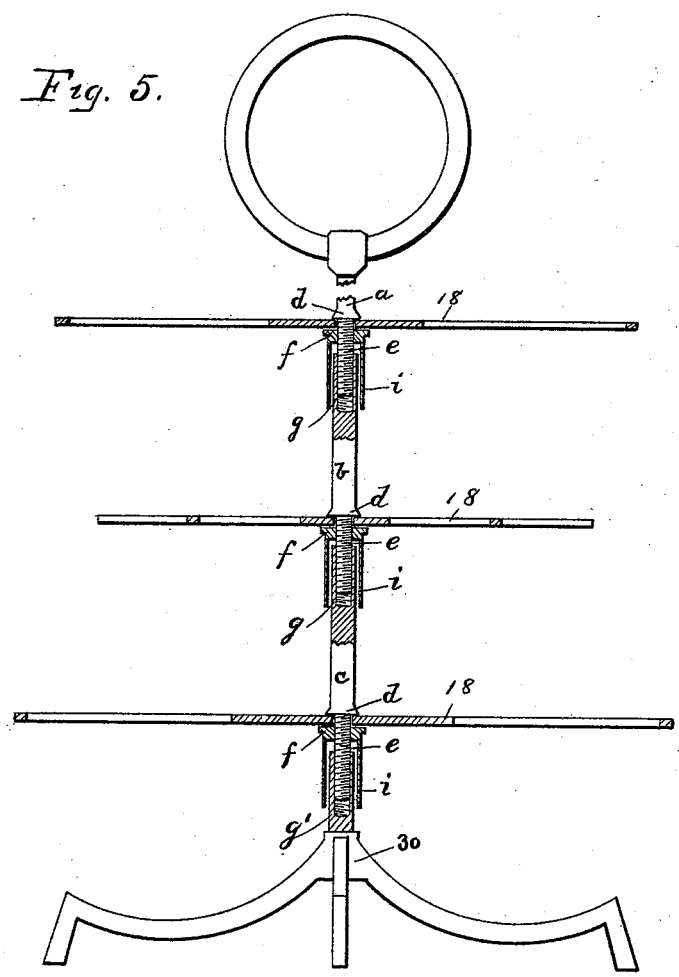
Figure 6:
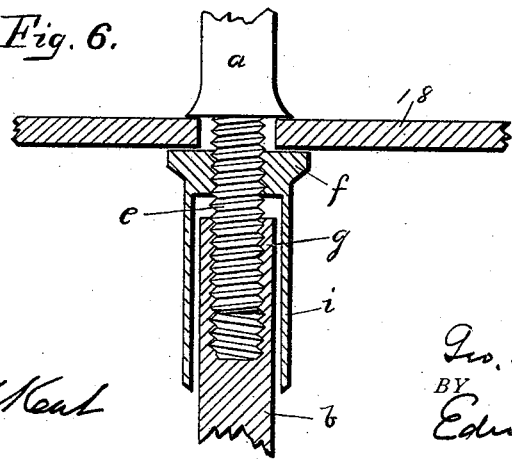

Figure 1 is a side view of my improved automatic egg-boiler, parts being broken away and a portion of the bottom of the boiler being shown in section. Fig. 2 is a side view of the egg receptacle or caster. Fig. 3 is a detail sectional view and upon an enlarged scale of a modified form of valve. Fig. 4 is a sectional plan view taken on line 4 4 of Fig. 2. Fig. 5 is a central sectional elevation of a modified form of caster, and Fig. 6 is an enlarged sectional detail view of a portion of the caster shown in Fig. 5.

In the drawings, 10 represents the main vessel or boiler, which by preference is in the form of a cylindrical pail. To this vessel there is secured a base 11, preferably in the form of the frustum of a cone, a series of apertures 2 being formed through the body of the base, as appears in Fig. 1. Instead of the base 11 any other proper base—as, for instance, three or more legs—could be employed.

To the bottom 12 of the vessel 10 I secure a ring 13, the central opening of said ring registering with an aperture 3, that is formed in the bottom 12. The ring 13 constitutes a seat for a valve 14, which is made integral with or rigidly connected to a stem 15, said stem extending upward through the bore of the ring 13 and the aperture 3 and increasing in diameter from the point 4 upward; but the diameter of the stem does not at any point exceed the diameter of the opening 3. To the upper end of the stem there is secured a plate 16, which serves as an abutment for a spring 20, the lower end of said spring bearing upon the bottom 12, whereby the valve 14 is normally held to its seat.

In Fig. 2 I illustrate an egg receptacle or caster made up of a central stem or standard 17 and two or more egg-receiving trays 18. The standard or stem 17 terminates in a flattened knob or projection 19, adapted to rest upon the plate 16.

In operation the vessel 10 is filled to overflowing with water which has been raised to a temperature of, say, 200° to 212° Fahrenheit, and then the caster shown in Fig. 2 is placed within the vessel, the desired number of eggs having been first adjusted to position upon the trays. The spring 20 is adjusted so that a single egg will depress the valve only to such an extent as to bring that section of the stem 15 which is of least diameter within the aperture 3 and the bore of the ring 13, and consequently the water contained within the vessel will be quickly discharged. If, however, a large number of eggs—say ten or twelve—are placed upon the caster, more water will be displaced from the vessel 10 when the caster is adjusted to place within the vessel, and consequently it is desirable that the flow of water from the vessel be decreased in volume, and it is to this end that I have formed the stem 15 tapering, as above set forth, for the increased weight will act with greater effect upon the spring 20 and the larger portion of the stem 15 will pass down into the aperture 3 and the bore of the ring 13, and consequently the water will not be so quickly discharged. Another point is that the introduction of a large number of eggs will cause the absorption of a greater number of heat units, and consequently the eggs should be subjected for a greater length of time to the action of the heated water, and in practice I have found it desirable to so proportion the stem 15 that the flow will be such as will leave the greater number of eggs in the water a longer time than the lesser number.

By providing a caster with three tiers of egg-receptacles I arrange for the delivery of three grades of eggs at a single operation— that is to say, the eggs of the upper tray will be soft, those carried by the middle tray medium, and those of the lower tray hard; but in certain instances it might be desirable to have all of the eggs cooked to a slightly greater extent or not cooked quite so much as they would be cooked if no adjustment of the spring 20 was provided for.

To secure the desired adjustment of the spring I could thread the upper end of the stem 15, as shown at 5 in Fig. 3, such threaded end fitting into a corresponding threaded socket 6, formed in a projection that extends downward from the plate 16, and then by turning the plate I am able to increase or diminish the tension of the spring, as will be readily understood.

It might sometimes happen that families would desire changes in the relative cooking of their eggs—that is to say, those using the medium eggs might wish to have them cooked a little more or a little less; so also with those using the hard and the soft boiled eggs; and to provide for this change in the relative cooking of the eggs I employ such a caster as is illustrated in Figs. 5 and 6, wherein the stem 17 is represented as being divided into sections $a$, $b$, and $c$, that are adjustably connected, the section $a$ being connected to the section $b$, the section $b$ to the section $c$, and the section $c$ to the base 30, each of the sections being formed with an annular shoulder $d$, which rests upon the upper face of the adjacent egg-rack, and with a threaded projection $e$, which engages a clamping-nut $f$, arranged to be turned up hard against the under face of the egg-rack. The sections $b$ and $c$ are formed with threaded sockets $g$, that are entered and engaged by the projections $e$ of the sections $a$ and $b$, respectively, while the projection $e$ of the section $c$ enters and engages the thread of a socket $g'$ formed in the base 30.

Although not positively essential, I prefer to form the nuts $f$ with downwardly-extending sleeves $i$, that overlap the socketed section ends, as this construction imparts a finish to the caster and also serves to strengthen it.

From the above description it will be seen that any one of the racks 18 may be raised or lowered, and also that, if desired, all of the racks may be raised or lowered.

Having thus fully described my invention, what I claim as new, and desire to secure by Letters Patent, is—

1. In an egg-boiler, the combination, with a vessel formed with a discharge-aperture, of a combined closing and flow-regulating valve and a spring arranged in connection with such valve, substantially as described.

2. In an egg-boiler, the combination, with a vessel formed with a discharge-aperture, of a valve adapted to close said aperture and formed with a stem which constitutes a regulating-valve and acts to control the flow from said aperture, and a valve-spring, substantially as described.

3. In an egg-boiler, the combination, with a vessel formed with an apertured bottom, of a valve arranged to close said aperture, a regulating-valve consisting of a stem of gradually-increasing diameter connected to the closing-valve, which said regulating-valve acts to control the flow from said aperture, and a spring arranged in connection with the valves, substantially as described.

4. In an egg-boiler, the combination, with a vessel formed with an apertured bottom, of a valve arranged to close said aperture and provided with a tapering stem which constitutes a flow-regulating valve, a spring arranged about said stem, and a plate adjustably connected to the stem, substantially as described.

5. In an egg-boiler, the combination, with a vessel formed with an apertured bottom, of a spring-actuated valve arranged to close said aperture and extend below the vessel-bottom, and a base which extends below the valve and serves as a support for the vessel, substantially as described.

6. In an egg-boiler, the combination, with a vessel formed with an apertured bottom, of a spring-actuated valve arranged to close said aperture and extend below the vessel-bottom, and a base which extends below the valve and serves as a support for the vessel, said base being formed with a number of apertures, substantially as described.

7. A caster consisting, essentially, of two or more egg-receiving racks and an adjustable sectional stem, substantially as described.

8. In an egg-receiving caster, the combination, with a base, of a stem adjustably connected thereto, racks carried by the stem, and a means for adjusting the stem between the racks, substantially as described.

In testimony whereof I affix my signature in presence of two witnesses.

GEORGE L. DALE.

Witnesses:
 EDWARD KENT, Jr.,
 E. W. DURKIN.